United States Patent [19]
Holthuis

[11] 3,993,565
[45] Nov. 23, 1976

[54] INCREMENTAL FEED SYSTEM

[75] Inventor: Johannes Jacobus Holthuis, Veendam, Netherlands

[73] Assignee: Nederlandse Industrie voor Baggerwerktuigen Nivoba N.V., Veendam, Netherlands

[22] Filed: Oct. 12, 1972

[21] Appl. No.: 296,814

[30] Foreign Application Priority Data
Oct. 13, 1971 Netherlands............... 7114104

[52] U.S. Cl. .............................. 210/396; 82/24 R; 83/356.3; 210/402; 408/153
[51] Int. Cl.² ........................................ B01D 33/36
[58] Field of Search ........... 210/396, 401, 402, 407; 82/24 R; 83/700, 356, 356.3; 408/153; 279/1

[56] References Cited
UNITED STATES PATENTS

| | | | |
|---|---|---|---|
| 2,072,586 | 3/1937 | Grant | 210/396 |
| 2,076,611 | 4/1937 | Barnebl | 210/396 |
| 2,102,780 | 12/1937 | Bielfeldt | 210/396 X |
| 2,120,455 | 6/1938 | Barnebl | 210/396 |
| 2,243,311 | 5/1941 | Ditzen | 210/396 |
| 2,793,547 | 5/1957 | Benjamin et al. | 408/153 |
| 3,520,410 | 7/1970 | Hutto, Jr. | 210/396 X |
| 3,610,644 | 10/1971 | Swanson | 279/1 |

OTHER PUBLICATIONS

Vol. I, 1957, pp. 34–36; vol. III, 1951, pp. 357–363; vol. IV, 1967, pp. 279–282; Ingenious Mechanisms for Designers and Inventors, The Industrial Press, 93 Worth Street, New York, N. Y.

Primary Examiner—Theodore A. Granger
Attorney, Agent, or Firm—John P. Snyder

[57] ABSTRACT

A precision system for moving a tool with very small increments with respect to a frame including at least two micrometer drive mechanisms each comprising a screw spindle and a cooperating nut and each provided with an intermittently driven worm and worm wheel. The tool is borne solely by the micrometer drive mechanisms that are supported in the frame. In a preferred embodiment is of each micrometer drive mechanism the worm wheel mounted on a spindle, one of said worm wheel and spindle being connected to the screw spindle and the other to the nut.

9 Claims, 5 Drawing Figures

INCREMENTAL FEED SYSTEM

This invention relates to a system for moving a knife, cutting tool or some other tool with very small increments with respect to a fixed frame by micrometer drive of said tool.

A system of this kind is known, for example, for advancing or feeding a lathe cutting tool. The cutting tool and the associated toolholder may be guided and borne by a slide which is displaceable via rods or in grooves. To move the cutting tool from rest, the static friction must first be overcome by exerting a certain force, whereupon the movement can be maintained with a smaller force which is just sufficient to overcome the dynamic friction. Each feed movement thus begins abruptly, and this is disturbing particularly for an advance through a very small distance each time, since the shock may result in a displacement through a greater distance than the intentional distance and in addition the displacement is not reproducible.

To obviate these disadvantages, the invention provides a system of this type characterized in that at least two micrometer drive mechanisms each comprising a screw spindle and a cooperating nut and each provided with a worm and worm wheel are provided between the tool and the frame, and the tool is borne in the frame solely by said micrometer drive mechanisms.

The above-mentioned effect may admittedly still occur but the abrupt displacement occurs mainly in the tangential direction with respect to the worm wheel and for a very small part equal to the tangent of the pitch angle of the displacement of the worm wheel in the axial direction. Since the displacement of the tool is in the direction of the worm wheel axis, the abrupt displacement has a limited influence thereon. This influence can be reduced still further by giving the spindle on which the wormwheel is mounted a large diameter with respect to the pitch of the nut, so that the value of the said tangent becomes very small.

Since the provision of a fine screwthread with a large diameter gives rise to problems, it is preferable to mount the worm wheel on the thick spindle, one of the said two parts being connected to the screw spindle and the other to the nut. In addition, the tool is thus not borne by the screw spindle but by the thick spindle.

It is also possible to construct the worm wheel in the form of a circulating ball nut which is axially displaceable and rotatable about the spindle so that the latter can be used both to produce the movement and carry the worm wheel.

To obtain an equal displacement with all the micrometer drives it is preferable to secure all the worms on the same drive shaft.

This drive shaft can be very satisfactorily driven by means of an eccentric having an adjustable crank length and coupled to a power source, one end of an articulated elongate tractive member, such as a toothed belt or a roller chain, which transmits only tractive forces, being connected to the crank while its other end is continuously loaded with a constant force, the tractive member extending over and engaging a wheel which is disposed on the worm shaft by means of a freewheel clutch which is preferably free from backlash and which engages only if the tractive member moves in the direction of the constant force. The movement of the tool can now be readily limited by a stop connected to the frame. If the tool or one of the parts connected thereto abuts the stop, the crank will alternately pay out and tauten the tractive member at one end but without damaging the tractive member or the freewheel clutch.

The above-described system is very suitable for mounting on a precoat drum filter, in which case the crank can be coupled to the drum drive means. A precoat drum filter is a vacuum filter, on the drum of which a coating of a particulate filter medium is provided for the actual filtering process, the coating being shaved off with a knife during the filtering process. The thickness of the layers to be shaved off should be very small in order to minimize lost time due to precoating the drum again and economize in respect of coating material. As a result of the considerable weight of the knife and the associated supporting means, the phenomenon which the system according to the invention is intended to obviate occurs to a considerable extent in the prior-art filters.

The invention will be explained in detail hereinafter with reference to the drawings of one embodiment thereof and an application thereof to the supporting and advance of a knife in a precoat filter.

Figure 4:
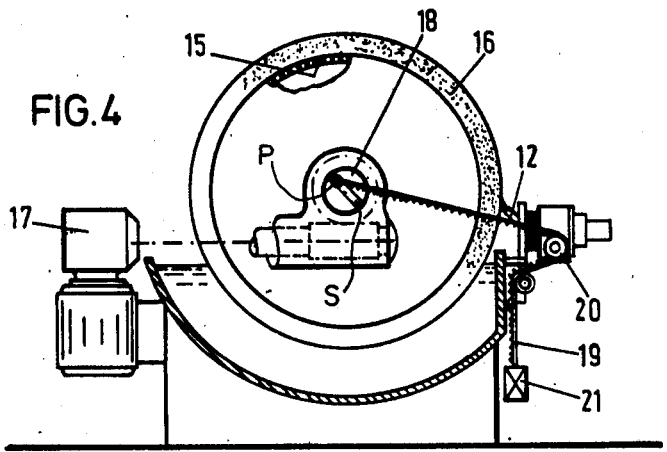
FIG. 4 is a diagrammatic cross-section through a precoat filter provided with the system according to the invention.
Figure 5:
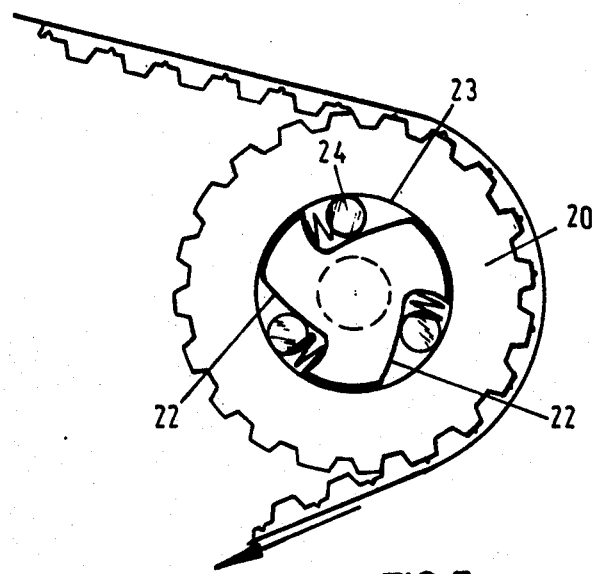

FIG. 5 diagrammatically illustrates a detail of FIG. 4 in section.

Figure 1:
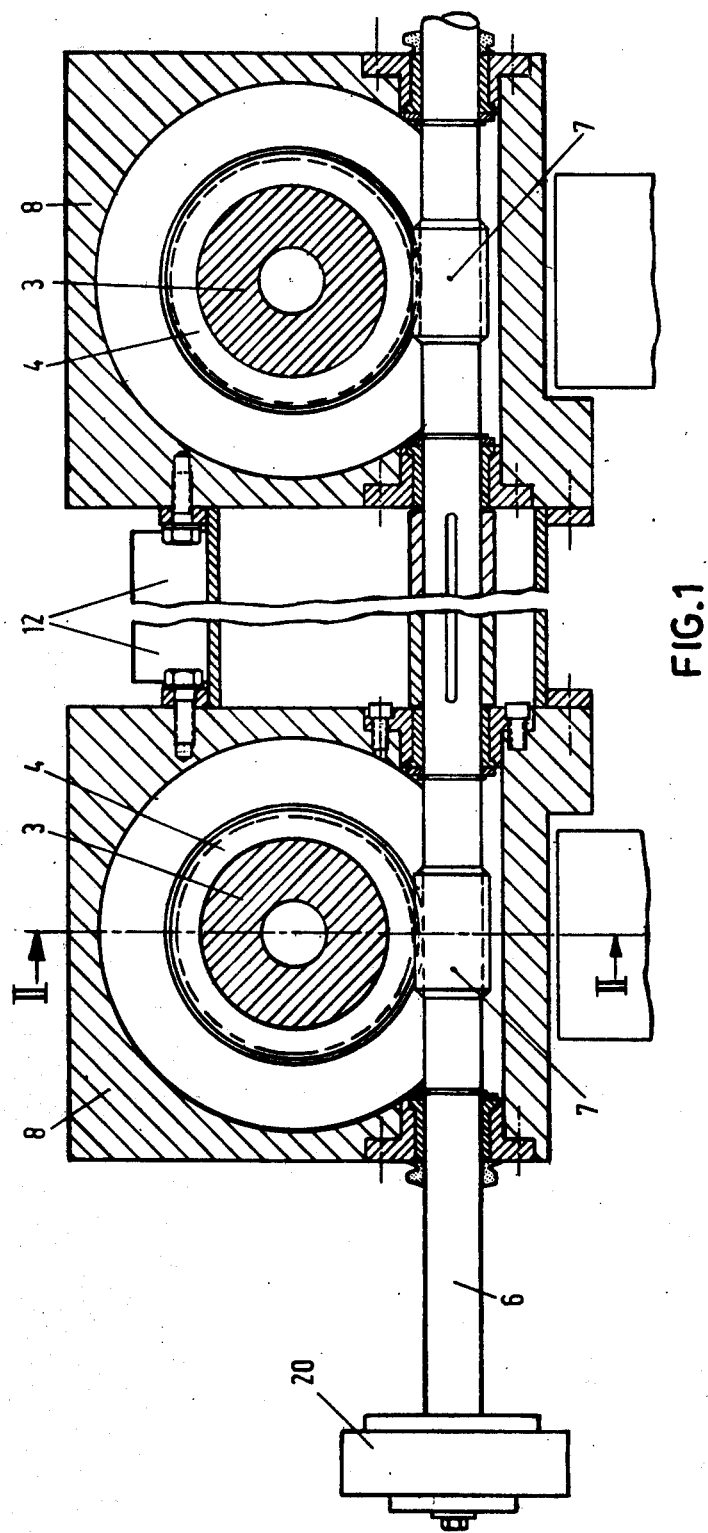
FIG. 1 is a vertical cross-section through one embodiment of the system according to the invention on the line I—I in FIG. 2.
Figure 2:
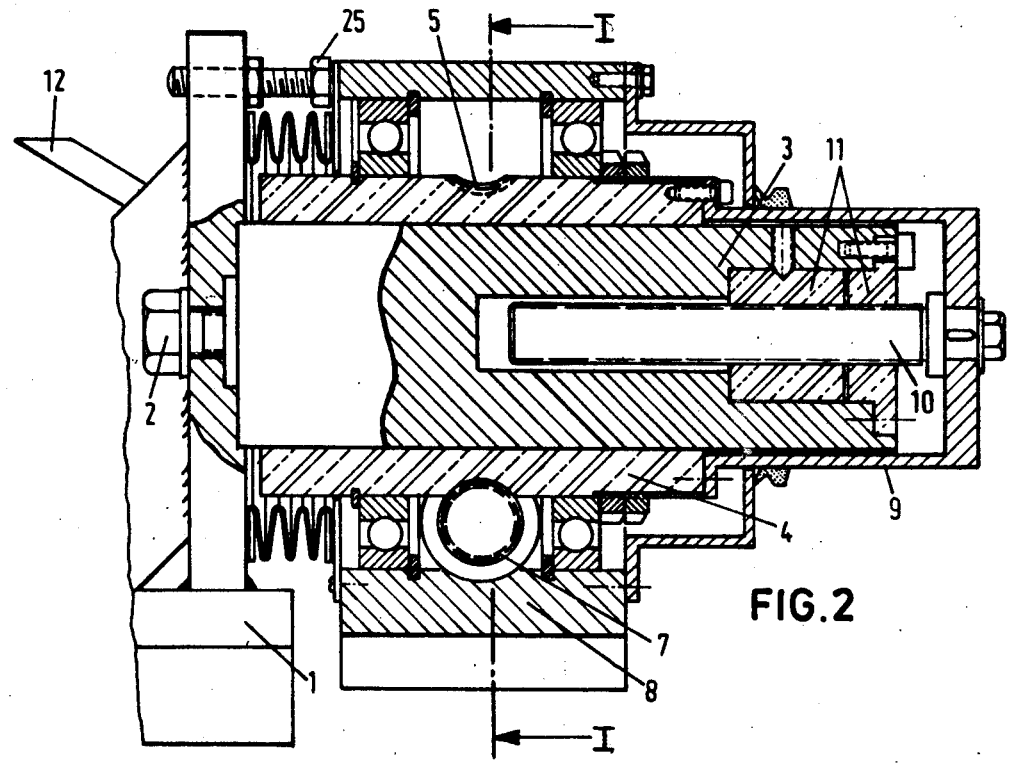
FIG. 2 is a vertical section on the line II—II in FIG. 1.

The system illustrated in FIGS. 1 and 2 comprises a frame 1, on which spindles 3 are secured by means of bolts 2. Bushes 4 are rotatable about the spindles and are mounted for axial displacement, and are provided with a worm wheel toothing 5, in which engages a worm 7 secured to a drive shaft 6. The latter is mounted in cages 8, in which the bushes 4 are mounted for rotation. The bushes 4 are each connected to a cap 9 which surrounds the free end of the associated spindle 3 and on which a screw spindle 10 is fastened, said screw spindle 10 extending concentrically in a central bore in the spindle 3. The screw spindle 10 is associated with a two-part nut 11 connected to the spindle 3.

If the drive shaft 6 is rotated, the worms 7 will cause the bushes 4 to rotate helically around the spindles 3 as a result of the cooperating screw spindles 10 and nuts 11. The cages 8 will therefore be moved with respect to the frame 1 in the direction of the center-line of the spindle 3 so that a knife 12 connected to the two cages 8 will also be moved with respect to the frame.

Figure 3:
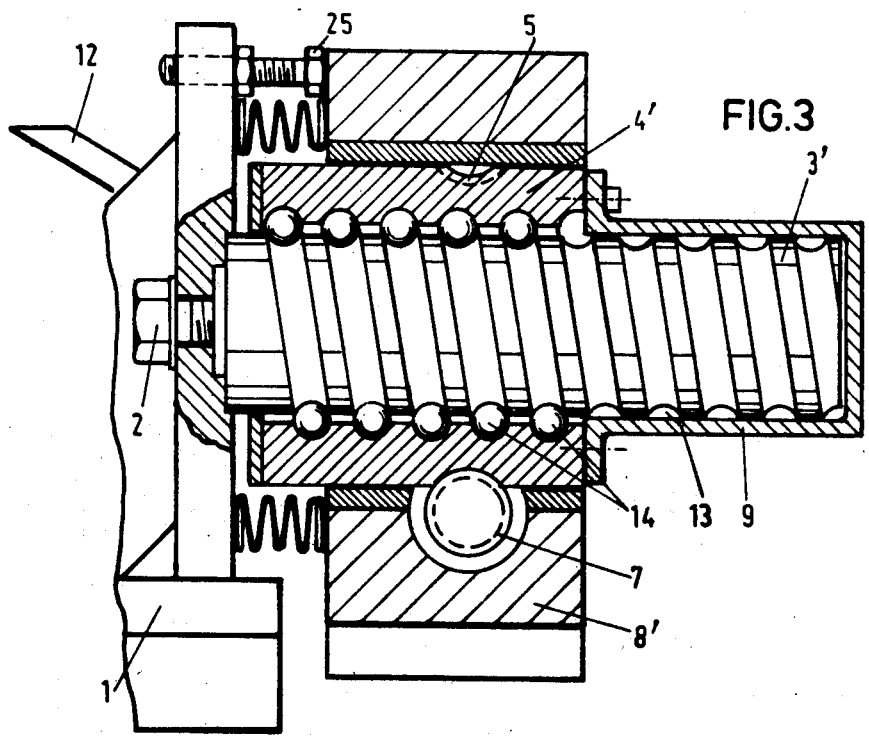
FIG. 3 shows a corresponding section to FIG. 2 through a somewhat modified embodiment.

FIG. 3 shows a slightly modified embodiment, in which those parts corresponding to parts shown in FIG. 2 have been given the same references. The spindle 3' in this embodiment is provided directly with a screwthread 13 in which the balls 14 of a bush 4' are movable, said bush being constructed in the form of a circulating ball nut. The cage 8' is also arranged with a plain bearing around the bush 4'.

FIG. 4 shows a diagrammatic cross-section through a precoat filter provided with the described system according to the invention for moving the knife 12 towards the drum 15 in order to shave a very thin layer off the coating 16. To advance the knife, the propulsive force in this case is derived from the drive means 17 from the drum. To this end, a disc 18 is connected to the drum shaft and is provided with a radial slot S in which a crank pin P is lockably movable, so that the crank pin is steplessly adjustable. The disc 18 and pin P constitute an eccentric drive having an adjustable crank length due to the adjustability of the pin P. A flexible toothed belt 19 is connected to the crank pin P and extends over a wheel 20 provided with matching teeth and is loaded by a weight 21. The wheel 20 is mounted on the drive shaft 6 by means of a freewheel clutch which is free of backlash. This clutch, which is shown diagrammatically in FIG. 5, is provided with springloaded rollers 24 disposed between ramps 22 rigidly connected to the shaft 6 and an internal cylindrical surface 23 of the wheel 20, and couples the latter to the shaft 6 when the wheel 20 rotates in the clockwise direction, i.e. on downward movement of the weight 21, and decouples it when the toothed belt 19 is pulled in by the crank. Thus as soon as the cage 8 abuts the stop 25, the drive shaft 6 cannot be rotated further, the wheel 20 cannot be turned further in the clockwise direction and the weight 21 will remain at the same height, while the part of the toothed belt 19 between the crank pin and the wheel 20 will hang slack on each revolution of the drum shaft.

What I claim is:

1. A precision system for moving a tool comprising, in combination:
    a frame with respect to which a tool is to be moved along a given rectilinear path;
    at least a pair of spindles fixed to said frame, said spindles being parallel and disposed with their axes aligned along said rectilinear path;
    a tool carrier having a tool fixed thereto;
    a pair of bushings rotatably journalled in and axially fixed to said tool carrier, one such bushing surrounding one of said spindles and the other bushing surrounding the other spindle; and each bushing having a circumferentially extending worm wheel thereon;
    drive shaft means having worms thereon for intermittently rotating said bushings to impart desired incremental movement of said tool carrier along said given path; and
    micrometer drive means connecting each bushing to its respective spindle for displacing said bushings axially of their respective spindles along said given path in response to rotation imparted to said bushings.

2. A precision system as in claim 1, wherein said drive shaft means includes a drive shaft and the worms of the drive shaft means are secured on said drive shaft, drivable by means of an eccentric having an adjustable crank length and coupled to a motor means, one end of an articulated elongate tractive member being connected to the crank while its other end is continuously loaded with a constant force, the tractive member extending over and engaging a wheel which is disposed on the drive shaft by means of a freewheel clutch which engages only if the tractive member moves in the direction of the constant force.

3. A precision system as defined in claim 2 including a precoat filter drum disposed with its axis perpendicular to said given path so as to have filter cake selectively removed therefrom by said tool and wherein drive means is provided for rotating said filter drum and said eccentric drive is connected to such drive means.

4. A precision system as in claim 2, wherein an abutment is connected to the frame for limiting the movement of the tool.

5. A precision system as defined in claim 1 wherein each said micrometer drive means comprises a screw spindle and a nut engaged therewith, one of said screw spindle and nut being fixed to an associated spindle and the other to an associated bushing.

6. A precision system as defined in claim 5 wherein each said nut is formed of two parts relatively rotatable to eliminate backlash.

7. A precision system as defined in claim 1 wherein each said micrometer drive means comprises a recirculating ball and nut arrangement in which each spindle and its associated bushing define a helically extending ball race and in which a plurality of balls are received in each such ball race.

8. A precision system as defined in claim 1 including a precoat filter drum disposed with its axis perpendicular to said given path so as to have filter cake selectively removed therefrom by said tool.

9. A precision system for moving a tool comprising, in combination:
    a tool carrier having a tool fixed thereto, which tool carrier and tool are to be moved in accurate individual increments along a given rectilinear path without significant error due to transitions between static and dynamic friction conditions incidental to the periodic incremental nature of tool movement;
    a frame with respect to which said tool carrier is to be moved periodically and incrementally along said given path;
    at least two spindles fixed to said frame and disposed in spaced, parallel relation with their axes aligned along said given path;
    a bushing concentric with each spindle and axially fixed with respect to said tool carrier and having a cylindrical guide surface engaging the spindle for axially sliding said bushing relative thereto and effecting corresponding periodic incremental movements of the tool carrier along said given path;
    micrometer drive means interconnecting each bushing with its spindle for effecting said axial sliding movement of the bushing only in response to substantial rotary motion of said bushing, whereby to obtain said accurate periodic incremental movements of the tool carrier without significant error due to the transitions between static and dynamic friction incidental to the incremental nature of tool movement; and
    drive means for periodically rotating said bushings to effect the individual incremental movements of said tool carrier.

\* \* \* \* \*